Sept. 20, 1927.
L. D. SOUBIER
1,642,904
METHOD AND APPARATUS FOR PRODUCING CHARGES OF MOLTEN GLASS
Filed Feb. 4, 1924
5 Sheets-Sheet 5
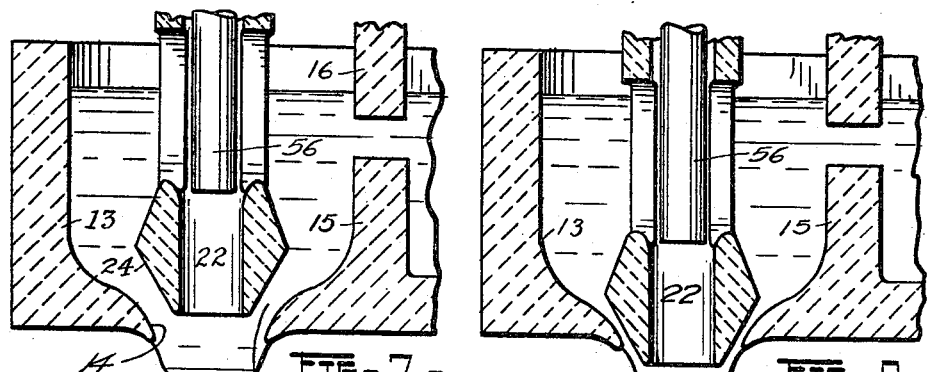
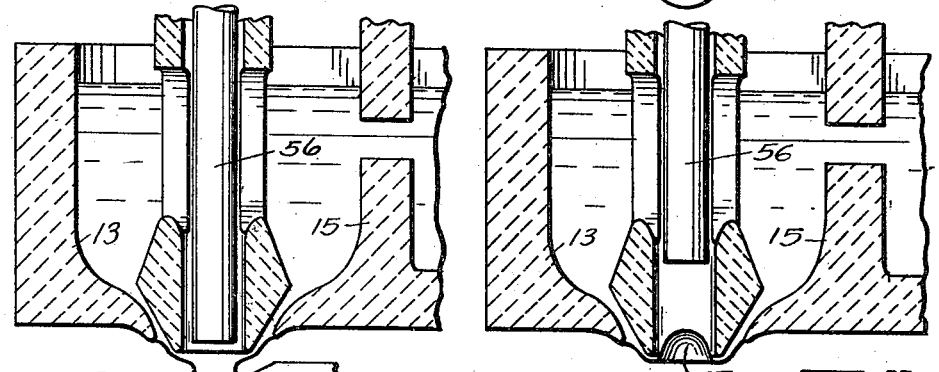
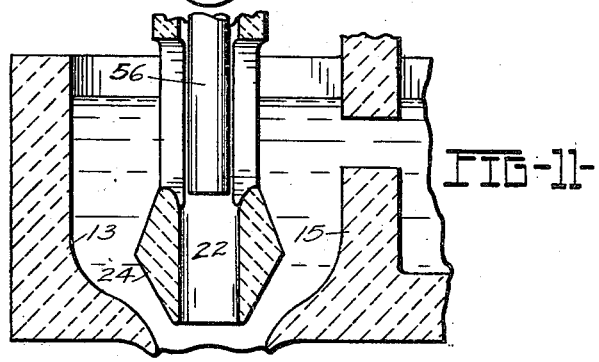
INVENTOR
Leonard D. Soubier
By J. F. Rule
His attorney.

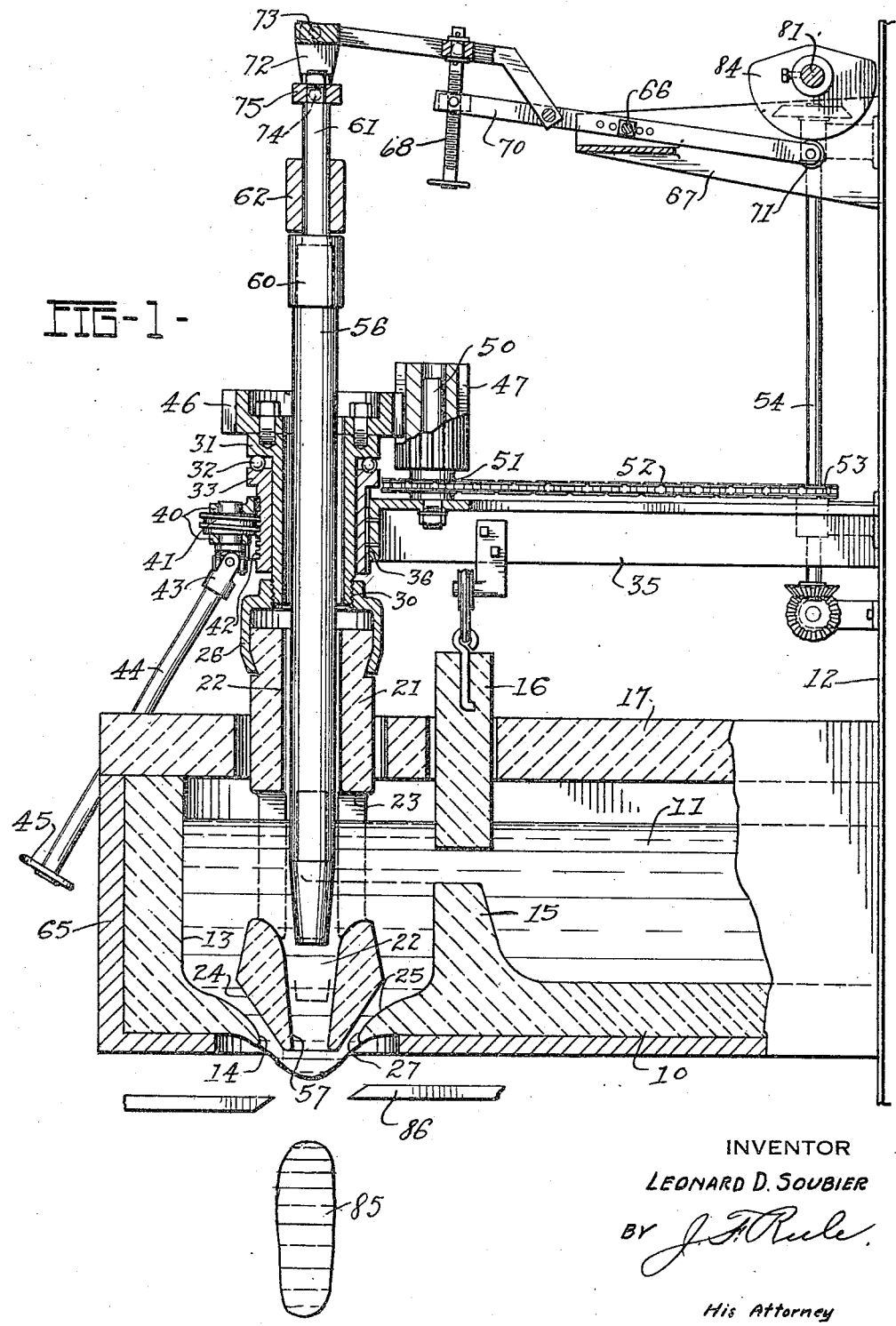

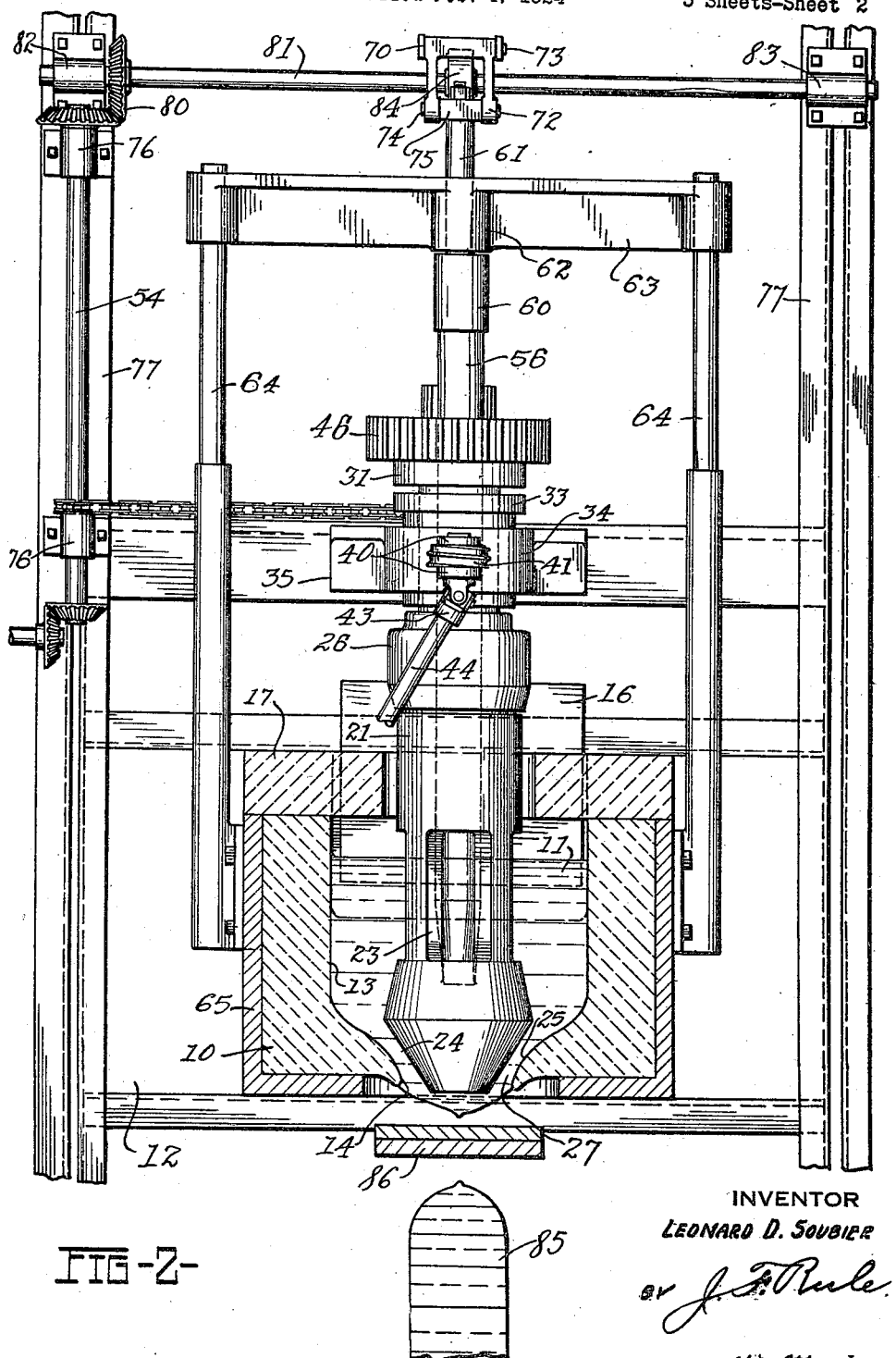

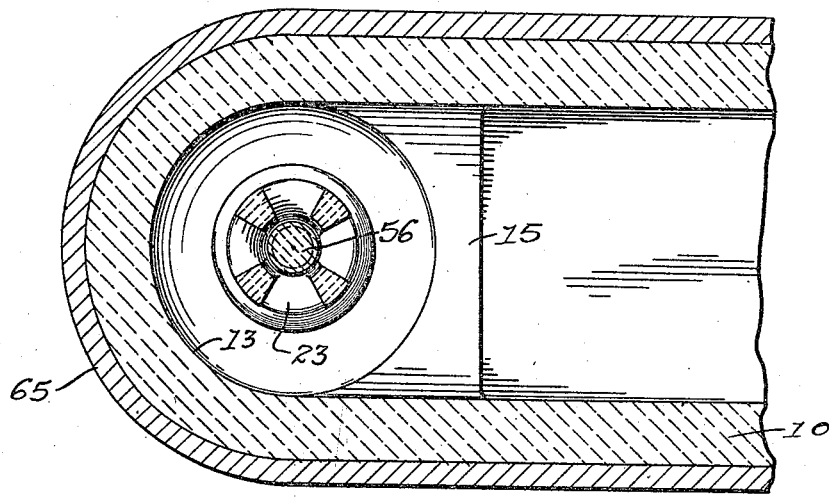
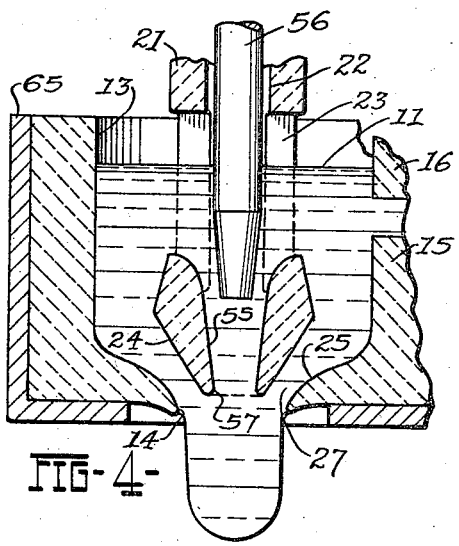
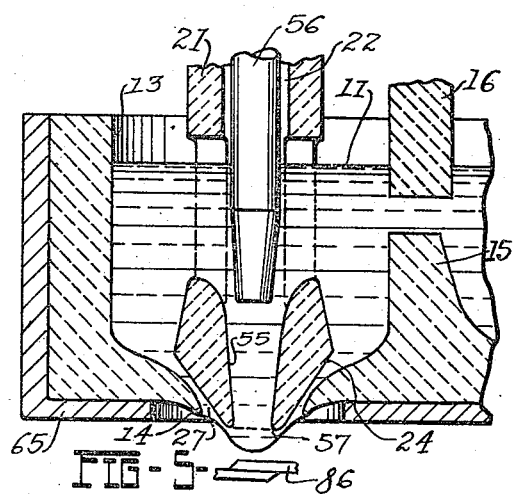

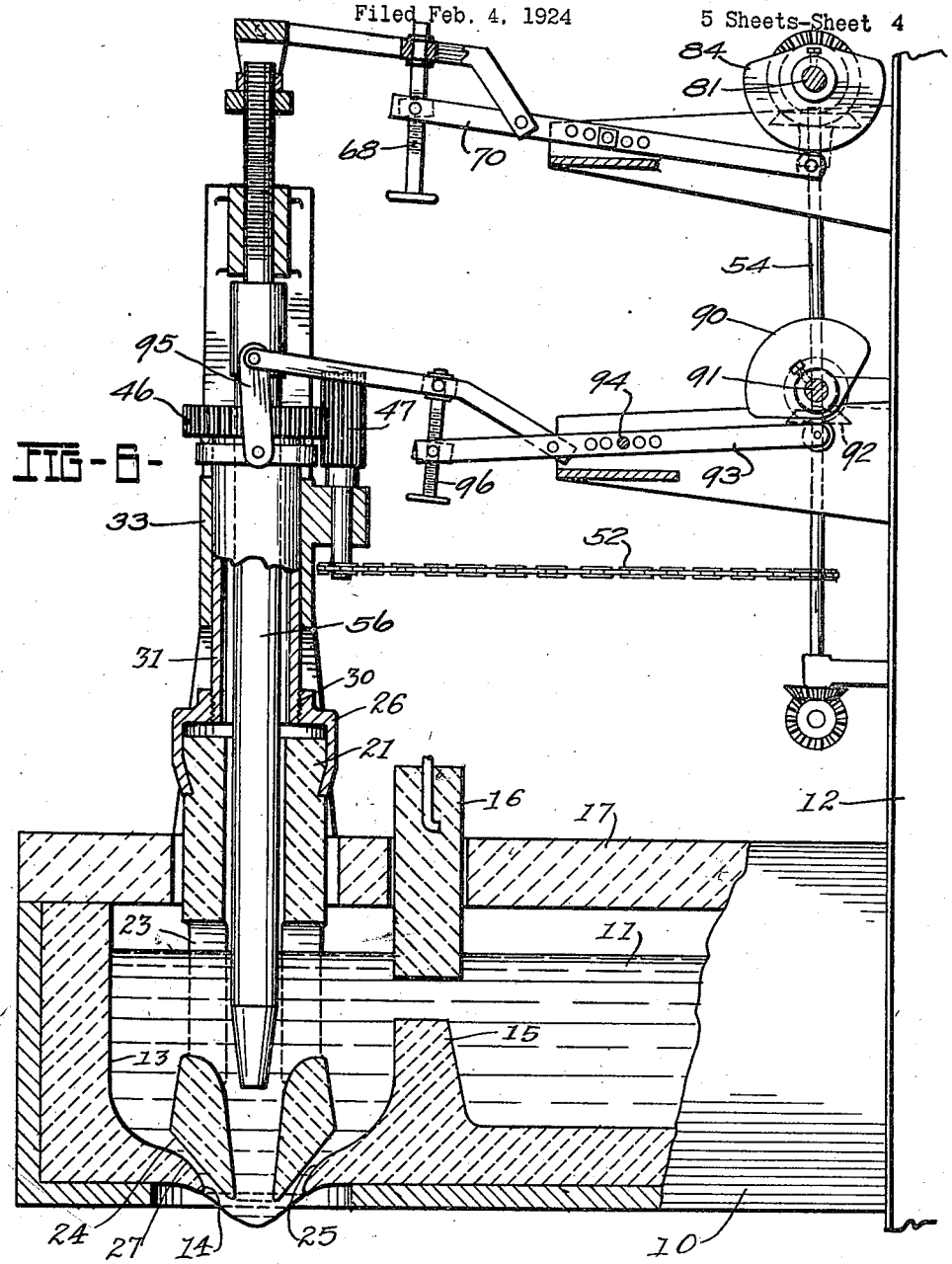

Patented Sept. 20, 1927.

1,642,904

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

METHOD AND APPARATUS FOR PRODUCING CHARGES OF MOLTEN GLASS.

Application filed February 4, 1924. Serial No. 690,408.

My invention relates to an improved method and apparatus for the delivery of charges of molten glass from a main body of glass, and particularly to improvements in that type of apparatus wherein a vertically reciprocating clay plunger or regulator projects into the glass above and in alignment with an outlet opening formed in a container, the reciprocation of the plunger controlling the issuance of the glass through the outlet.

In feeders of this general type at present known and in use, the issuing glass forms suspended masses or gobs which are periodically severed and dropped into forming molds. The length and weight of the suspended gobs can be controlled and varied to a certain extent by varying the movements of the regulating plunger. The diameter of the suspended gob, however, is determined mainly by the diameter of the outlet opening which remains constant during the operation of the feeder. In order to change this diameter, it has been found necessary in practice to shut down the feeder, drain off the glass, remove the clay bushing in which the outlet opening is formed and substitute a new bushing having an opening of different diameter. This evidently results in a great loss of time during which production is suspended, particularly as it takes considerable time after the feeder has been shut down and again started to get the feeder regulated and the glass again in suitable condition for entering the molds.

An object of my invention is to provide a practical means and method of varying the effective diameter of the outlet opening while the feeder is in operation. In this manner, the diameter and weight of the issuing charge of glass can be readily varied or adjusted without interrupting the operation of the feeder. This in combination with means for adjusting the movements of the regulating plunger and the usual means for timing the operations of the cutters relative to those of the plunger, and regulating the frequency of operation of the plunger and cutters,—permits the size, shape and weight of the gobs or charges to be readily controlled and adjusted through a wide range. These adjustments, moreover, may be effected without interrupting the normal operation of the feeder.

A further object is the provision of a feeding device wherein the extrusive and retractive action upon the issuing glass may be made more pronounced or lessened to suit operating conditions.

A still further object is the provision of means whereby a charge of molten glass may be obtained, though the movements of the glass actuating member are the reverse of those movements of the actuating members now in use.

The present application discloses certain subject matter of invention disclosed and claimed in my co-pending application Serial Number 684,296, filed January 4, 1924, apparatus for delivering charges of molten glass.

In the accompanying drawings:

Figure 1 is a sectional side elevation of a feeder embodying my invention.

Figure 2 is a part sectional front elevation of the same.

Figure 3 is a sectional plan view showing the discharge chamber and control members.

Figure 4 is a diagrammatic view showing the parts adjusted to provide a comparatively large outlet opening.

Figure 5 is a similar view showing the parts adjusted to provide a comparatively small opening.

Figure 6 is a view similar to Figure 1, but showing a modified form of apparatus and discloses a new method of operation.

Figures 7 to 11 inclusive are diagrammatic views illustrating successive steps in the formation of a gob with the feeder shown in Figure 6. Figure 7 shows the regulating plunger and sleeve in their uppermost position and the glass commencing to flow downward after a charge has been severed. Figure 8 shows the plunger and sleeve moved downward together, and the sleeve in its lowermost position. Figure 9 shows the plunger moved downward from the Figure 8 position to expel the glass from the chamber formed in said sleeve. Figure 10 shows the plunger lifted relative to the sleeve. Figure 11 shows the sleeve and plunger elevated to the starting position, permitting the flow of glass to again be established.

Referring to the drawings, 10 designates a furnace boot or extension which is continuously supplied with molten glass 11 from a furnace 12. Formed in the outer end of the boot 10 is a circular pot or discharge chamber 13 having formed in the bottom thereof an outlet opening 14 through which the glass may issue. One of the walls 15 of the pot is arranged to form with an adjustable gate 16, an adjustable opening through which the glass flows to the pot 13 and may be regulated in its passage thereto or entirely shut off when desired. A cover block 17 prevents the escape of the heat from the boot 10. A vertically disposed clay sleeve member 21 projects downward through the glass and into the opening 14, said member having an opening through the center thereof which provides a sort of a pocket or chamber 22. A series of openings 23 are formed in the side walls through which the glass may enter the chamber. The lower end of the sleeve is formed with tapered outer walls 24 which form with the walls 25 of the outlet opening 14, an annular passageway 27 through which the glass may flow in regulated quantities.

The clay sleeve is mounted in a holder 26 (Figs. 1 and 2) which has a screw threaded connection 30 with a bearing sleeve 31 mounted for rotation on a roller bearing 32, and supported by a bearing sleeve 33. The bearing sleeve 33 is supported by a bearing 34 formed at the outer end of a bracket 35, and is prevented from rotating by a key 36 attached to said bearing 34. Lug extensions 40 formed on the bearing 34 support a worm 41 which meshes with teeth 42 formed on the bearing sleeve 33. A universal joint 43 connects the worm 41 with an adjusting rod 44, said rod carrying a hand wheel 45 and providing a means for adjusting the sleeve 21 vertically to thereby regulate the effective area of the outlet opening 14. The sleeve 21 is rotated continuously by means of a spur gear 46 (Fig. 1) attached to the upper end of the bearing sleeve 31, said gear running in mesh with a pinion 47. Projecting upward from the bracket 35 is a vertical shaft 50 upon which the pinion is mounted for rotation, said pinion having formed at its lower end a sprocket 51. A chain 52 forms a driving connection between the sprocket 51 and a second sprocket 53 mounted on a drive shaft 54, this drive shaft receiving its power from any suitable source.

Projecting downward through the bearing sleeve 31 (Fig. 1) and into the chamber 22 in the clay sleeve 21 is a plug or plunger 56 which is mounted for vertical reciprocation. This plunger reciprocates above and in alignment with an opening 57 formed in the lower end of the sleeve 21. The plunger 56 is mounted in a holder 60 having a stem 61 projecting upward through a bearing 62 formed in a bracket 63, and is guided in its movements by said bearing. Vertical uprights 64 projecting up from the boot supporting casting 65, support the bracket 63 and allow for its vertical adjustment. Pivoted at 66 in a bracket 67 is a rocker arm or lever 70 carrying at its inner end a cam roll 71 and at its outer end a yoke 72 pivotally connected at 73 to the lever. The yoke is pivotally connected at 74 to a pivot block 75 attached to the stem 61 of the plunger 56. A screw adjustment 68 is provided, whereby the height of the plug may be varied with relation to the outlet 57 of the sleeve 21. The drive shaft 54 (Fig. 2) is vertically disposed in bearings 76 mounted on the furnace supports 77 and has a bevel gear connection 80 with a horizontal cam shaft 81, said shaft mounted in bearings 82 and 83 and carrying a control cam 84.

In operation, the gate 16 is raised, allowing the glass to flow into the pot 13. As the glass flows into the pot it also flows through the openings 23 in the clay sleeve 21 and thence down into the chamber 22 and through opening 57 and opening 14 in the pot. The quantity of glass passing through these openings will, of course, depend upon the particular operating position of the sleeve and the clay plug 56. The sleeve 21 is rotated continuously through its driving connections with the shaft 54, this rotation being for the purpose of circulating the glass in the pot 13. The clay sleeve is also adjustable vertically as before noted, this adjustment being particularly for the purpose of varying the diameter of the charge produced, although other results may and will be obtained.

Referring to Figure 4, it will be noted that the sleeve 21 is shown in its high adjustment allowing the glass to issue in a stream or column, the diameter of which is affected very little, if at all, by the sleeve 21 when in this position. In Figure 5, the sleeve is shown at or near its lowermost position, wherein the bulk of the glass passes through the opening 57 in the sleeve, there being only enough glass flowing through the passageway 27 to prevent freezing at this point. The diameter of the issuing glass is in this instance substantially that of the outlet 57. Any variation between these two positions, shown in Figures 4 and 5, will give a variation in the diameter of the charge produced. These adjustments of the sleeve 21 may also be utilized for the purpose of varying the weight of charge produced as well as the diameter.

The scope of the above mentioned adjustments is, of course, limited to a certain extent by the size of the opening 57, but a sleeve or sleeves may be provided having openings of various diameters, thereby increasing the effective range.

Continuing with the operation, the rotation of the control cam 84 will periodically reciprocate the plug 56, which upon its down stroke will force out a quantity of glass through the opening 57 and on its up stroke retract the cut stub end of the glass. The quantity of glass forced through the outlet 57 together with that which flows by gravity through the annular passageway 27 forms a mold charge 85 which is severed from the remaining glass by shears 86 which may be any suitable form of shears known in the art.

In the modification shown in Figure 6, provision is made for automatically reciprocating the regulating sleeve 21 vertically in synchronism with the movements of the plunger 56. For this purpose, a cam 90 is provided, said cam being mounted on a shaft 91 having a driving connection through spur gearing 92 with the shaft 54. The cam 90 is thus driven at the same angular speed as the cam 84. The cam 90 operates through a lever 93 having a fulcrum 94, said lever connected at its outer end through links 95 with the sleeve 33. The lever 93 is provided with adjusting means 96 which may be similar to the adjustment 68, for adjusting the sleeve 21 up or down.

In the operation of the mechanism shown in Figure 6, the plunger 56 and regulating sleeve 21 are periodically reciprocated vertically in synchronism. The position of the sleeve 21 at any period during a cycle of movements of the plunger 56 depends upon the relative adjustment of the cams 84 and 90. Each of these cams is preferably adjustable angularly on its shaft, whereby the relative movements of the parts 56 and 21 may be adjusted in accordance with the results desired, particularly as to shape and size of gob.

Figures 7 to 11 inclusive illustrate successive steps in the formation of a gob. Figure 7 shows the plunger and sleeve in their uppermost positions shortly after a suspended gob has been severed. The glass has commenced to flow through the outlet 14 for the formation of the succeeding gob. After the initial flow has been established, the plunger and sleeves together move downward to the Figure 8 position, whereby the flow of glass through the annular channel 27 is substantially cut off. The sleeve is now in its lowermost position, but the plunger continues its downward movement to the Figure 9 position, thereby expelling the glass from the chamber 22, thus completing the extrusion of glass required to complete the suspended gob 85. If desired, the plunger may commence its upward movement before the gob is severed, thereby causing a necking-in of the glass at the plane of severance before the knives 86 operate. The plunger is moved upward to the Figure 10 position while the sleeve remains in its lowermost position. This upward movement of the plunger retracts the stub of glass remaining after the shears operate, as indicated at 97, so that it is incorporated in the next succeeding gob. As the plunger continues its upward movement from the Figure 10 position to the Figure 11 position, the sleeve moves upward with it, thereby bringing the parts back to the Figure 7 position and permitting a downward flow of glass to be reestablished, thereby completing the cycle.

The operation described in the preceding paragraph may be substantially modified by adjusting either cam 84 or 90 to vary the relative movements of the plug and sleeves. The operation may be further modified by adjustment of the sleeve up or down.

Modifications may be resorted to within the spirit and scope of my invention.

What I claim is:

1. The combination of a container for molten glass having an outlet opening formed in the bottom thereof, a vertically reciprocating plunger projecting downward into the glass in the container in alignment with said opening, and a sleeve surrounding said plunger and spaced therefrom, the lower end of said sleeve being of smaller external diameter than the diameter of the outlet opening and shaped to enter said opening and form therewith an annular passageway through which glass may be discharged.

2. The combination of a container for molten glass having an outlet opening formed in the bottom thereof, a vertically reciprocating plunger projecting downward into the glass in the container in alignment with said opening, a sleeve surrounding said plunger and spaced therefrom, to provide a chamber to contain molten glass, said sleeve projecting downward into said outlet opening and provided with inlet openings spaced above its lower end through which the glass may enter the chamber and provided with an outlet opening in its lower end in line with the outlet in the container, means to rotate said sleeve and means to cause a periodic discharge of glass through said chamber outlet.

3. In a glass feeding apparatus, the combination of a container for molten glass having an outlet opening in the bottom thereof through which the glass issues, a vertically reciprocating plunger projecting into the glass above and in alignment with said opening, and a hollow member surrounding and separate from the plunger, projecting into said opening and movable relatively thereto for varying the effective area of the opening.

4. In a glass feeding apparatus, the combination of a container for molten glass having an outlet opening in the bottom thereof through which the glass issues, a vertically reciprocating plunger projecting into the glass above and in alignment with said opening, and means surrounding the plunger and projecting downward within the walls of said outlet and cooperating therewith to form an annular passageway through which a gravity flow of glass may be obtained.

5. In a glass feeding apparatus, the combination of a container for molten glass having an outlet opening in the bottom thereof through which the glass issues, a vertically reciprocating plunger projecting into the glass above and in alignment with said opening, means surrounding the plunger and projecting downward within the walls of said outlet and cooperating therewith to form an annular passageway through which a gravity flow of glass may be obtained, and means to vary the quantity flow of glass through said outlet.

6. The combination of a container for molten glass having an outlet opening formed in the bottom thereof, a vertically disposed hollow member projecting downward into the glass concentrically with said opening, said member formed to provide a chamber in the lower end thereof having an outlet opening in its bottom smaller than said first mentioned opening, a regulator disposed within said member, means to actuate said regulator to cause a periodic discharge of molten glass through said chamber outlet, and means to maintain the glass within said hollow member at substantially the level of the glass within said container throughout the normal operation of said regulator.

7. In a device for producing charges of molten glass, the combination of a container for molten glass having an outlet opening in the bottom thereof, a regulator within the glass over the outlet, means to periodically actuate the regulator to control the discharge of glass, a hollow auxiliary regulating member surrounding said regulator and extending downward into the outlet, the lateral walls of said member being shaped to form with the walls of said outlet an annular passageway through which glass issues, and means to adjust said member vertically to vary the effective area of said outlet.

8. In a device for producing charges of molten glass, the combination of a container for molten glass having an outlet opening in the bottom thereof, a hollow member formed with an outlet opening in the bottom thereof and positioned to control the effective size of said first mentioned opening, a vertically reciprocating regulator disposed within said member, and means to continuously rotate said member.

9. In a device for producing charges of molten glass, the combination of a container for molten glass having an outlet opening in the bottom thereof, a hollow member formed with an outlet opening in the bottom thereof and positioned to control the effective size of said first mentioned opening, a vertically reciprocating regulator disposed within said member, means to continuously rotate said member, and means to move said member toward and from the outlet opening in the container and thereby vary the quantity of glass issuing from the container.

10. In a device for feeding charges of molten glass, the combination of a container for the glass having an outlet opening in the bottom thereof, a stationary auxiliary chamber, means for supplying glass to the auxiliary chamber from said container, said auxiliary chamber having an outlet in the bottom thereof and in alignment with said container outlet, means to cause the glass to issue from said outlets, means to vary the volume of glass passing through the outlet of the auxiliary chamber, and separate means to independently vary the volume of glass passing through the first mentioned outlet opening.

11. The combination of a container for molten glass provided with an outlet opening extending through the floor thereof, a tubular member projecting into said opening and movable relatively thereto to vary the effective size of the outlet, and a regulating device operating periodically within the container to control the discharge of glass through the outlet.

12. The combination of a container for molten glass provided with an outlet opening extending through the floor thereof, a tubular member projecting into said opening and movable relative thereto to vary the effective size of the outlet, a regulating plunger within said tubular member, and means to periodically reciprocate the plunger over the outlet.

13. The combination of a container for molten glass provided with an outlet opening in the bottom thereof, a device within the container projecting downward into the outlet for controlling the effective area of the outlet, means to periodically actuate said device and thereby periodically vary the area of the outlet, and a regulator operating in the glass adjacent the outlet in synchronism with said device to control the discharge of glass through the outlet.

14. The combination of a container for molten glass provided with an outlet opening in the bottom thereof, a device within the container projecting downward into the outlet for controlling the effective area of the outlet, means to periodically actuate said device and thereby periodically vary the area of the outlet, a plunger, and means to reciprocate the plunger over the outlet in synchronism with the movements of said device.

15. The combination of a container for molten glass provided with an outlet, a hollow regulating device having tapered walls opposite the walls of the outlet, said walls providing an annular convergent passageway for a portion of the issuing glass, means to move said device vertically within the glass over the outlet and thereby vary the effective area of the outlet, and a plunger within said regulating device and reciprocating in the glass over the outlet to control the discharge of glass.

16. Apparatus for delivering charges of molten glass comprising in combination a container having an outlet opening in the bottom thereof, a regulating plunger, automatic means to periodically reciprocate it vertically in the glass over the outlet, a hollow regulating member surrounding the plunger and having its outer walls tapered at the lower end of said member, said tapered walls forming with the walls of said outlet an annular passageway for the discharge of glass, and means to move said hollow member vertically and thereby vary the rate of discharge through said passageway by varying the size of said passageway.

17. Apparatus for delivering charges of molten glass comprising in combination a container having an outlet opening in the bottom thereof, a regulating plunger, automatic means to periodically reciprocate it vertically in the glass over the outlet, a hollow regulating member surrounding the plunger and having its outer walls tapered at the lower end of said member, said walls forming with the walls of said outlet an annular passageway for the discharge of glass, and means to move said hollow member vertically and thereby vary the size of said passageway, said hollow member formed with an opening to admit glass at a point above its lower end, said member providing a chamber below the plunger to receive a measured quantity of glass, the plunger being operable in its downward movement to expel said glass from said chamber and add it to the glass which flows through said annular passageway.

18. In apparatus for delivering charges of molten glass, the combination of a container for the glass having an outlet opening in its bottom, a tube open at its lower end and positioned within the container to control the effective area of said outlet, means to move said tube to vary said area, means to introduce glass into the tube at a point above its lower end and cause it to flow downward and discharge through the outlet, and automatic means to rotate said tube about the axis of the outlet and thereby cause a circulation of the glass in the container.

19. The combination of a container for molten glass having an outlet opening in its bottom, a hollow regulating device projecting downward into the glass above said opening, means to introduce glass into said device at a point above its lower end and cause it to flow downward and discharge through the outlet, manual means to adjust said device up and down, automatic means to periodically reciprocate said device vertically, and automatic means to rotate said device about the axis of the outlet.

20. The combination of a container for molten glass having an outlet opening in its bottom, a hollow regulating device projecting downward into the glass above said opening, manual means to adjust said device up and down, automatic means to periodically reciprocate said device vertically, automatic means to rotate said device about the axis of the outlet, a plunger, and automatic means to periodically reciprocate the plunger vertically within said device in synchronism with said periodic reciprocations of said device.

21. The combination of a container for molten glass having an outlet orifice in the bottom thereof, a regulating device within the container and projecting into said orifice and thereby restricting its area, means to periodically actuate said device to increase and decrease the effective area of said orifice, and regulating means cooperating with said device to periodically impart an expelling force to the glass within the container in synchronism with the said increase and decrease in the area of said orifice 22. Glass feeding mechanism comprising in combination a container for molten glass having an outlet opening extending through the floor thereof, a hollow body of refractory material in the glass in the container and projecting downward into said opening, means for moving said body to vary the effective size of the outlet, and a regulating device operable periodically within said hollow body by a movement relative to said body to control the discharge of glass through the outlet.

23. The combination of a container for molten glass having an outlet opening in the bottom thereof, inner and outer plunger devices concentrically arranged over said outlet, said outer device extending downward into the outlet opening, and separate means for periodically reciprocating each of said devices over the outlet.

Signed at Toledo, in the county of Lucas and State of Ohio, this 31st day of January, 1924.

LEONARD D. SOUBIER.